US012583152B2

(12) United States Patent
Summerer et al.

(10) Patent No.: US 12,583,152 B2
(45) Date of Patent: Mar. 24, 2026

(54) INJECTION MOLDING APPARATUS AND INJECTION MOLDING PROCESS FOR PRODUCING MULTICOMPONENT PLASTICS MOLDINGS

(71) Applicant: Summerer Technologies GmbH & Co. KG, Schechen (DE)

(72) Inventors: Sebastian Summerer, Rimsting (DE); Franz Josef Summerer, Gstadt am Chiemsee (DE)

(73) Assignee: Summerer Technologies GmbH & Co. KG, Schechen (DE)

( * ) Notice: Subject to any disclaimer, the term of this patent is extended or adjusted under 35 U.S.C. 154(b) by 304 days.

(21) Appl. No.: 18/087,878

(22) Filed: Dec. 23, 2022

(65) Prior Publication Data

US 2023/0211529 A1 Jul. 6, 2023

(30) Foreign Application Priority Data

Dec. 30, 2021 (DE) ...................... 10 2021 006 412.7

(51) Int. Cl.
| | |
|---|---|
| *B29C 45/06* | (2006.01) |
| *B29C 45/16* | (2006.01) |
| *B29C 45/26* | (2006.01) |

(52) U.S. Cl.
CPC .......... *B29C 45/062* (2013.01); *B29C 45/162* (2013.01); *B29C 45/1628* (2013.01); *B29C 45/1675* (2013.01); *B29C 45/2681* (2013.01)

(58) Field of Classification Search
CPC ..... B29C 45/045; B29C 45/06; B29C 45/067; B29C 45/10; B29C 45/162; B29C 45/1828; B29C 45/32; B29C 2045/2683; B29C 45/2681

USPC ................................................ 264/297.3, 294
See application file for complete search history.

(56) References Cited

U.S. PATENT DOCUMENTS

| | | | | |
|---|---|---|---|---|
| 6,468,458 | B1 * | 10/2002 | Anderson | ............... B29C 45/16 |
| | | | | 264/328.8 |
| 2007/0213868 | A1 * | 9/2007 | MacDonald | .......... B29C 45/045 |
| | | | | 700/197 |
| 2012/0049408 | A1 * | 3/2012 | Okamoto | ............ B29C 45/1675 |
| | | | | 425/576 |

FOREIGN PATENT DOCUMENTS

| | | |
|---|---|---|
| DE | 4408426 A1 | 9/1995 |
| DE | 102012107171 A1 | 2/2014 |
| EP | 0671251 A1 | 9/1995 |

* cited by examiner

*Primary Examiner* — Alison L Hindenlang
*Assistant Examiner* — Debjani Roy
(74) *Attorney, Agent, or Firm* — Cooper Legal Group, LLC

(57) ABSTRACT

An injection molding apparatus for producing a plastics molding comprising a first component, a second component, and a third component comprises a first mold plate having at least 3 first mold nests, and a second mold plate having at least 3 second mold nests. In the closed state, the mold plates cooperate in the production of the plastics mold. In the opened state, the second mold plate is rotatable relative to the first mold plate. The at least 3 second mold nests comprise, in a case A), at least two second mold nests for injection molding the first component, and at least one second mold nest for injection molding the third component, or, in a case B), at least two second mold nests for injection molding the second component, and at least one second mold nest for injection molding the first component.

10 Claims, 17 Drawing Sheets

100

1K

1K

115

110

1K

130

2K

• M

125

135

120

2K

2K

128

138

2K

3K

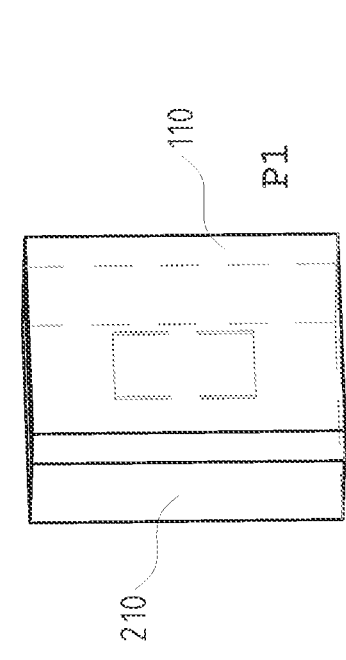
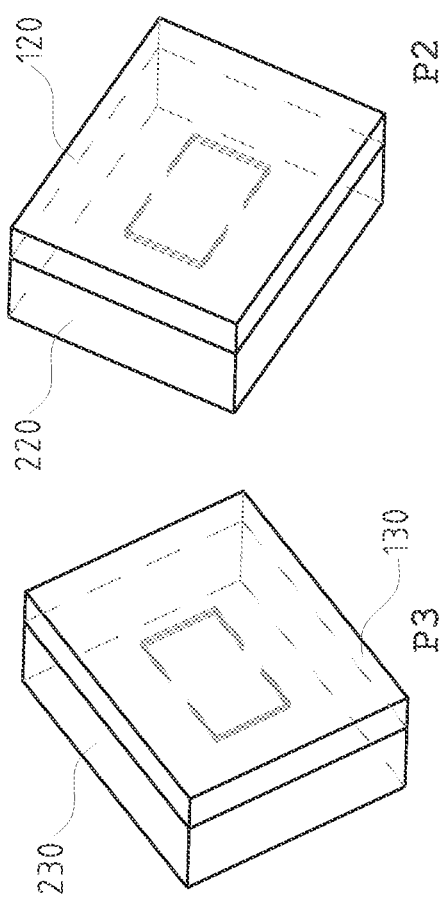
Fig. 3A

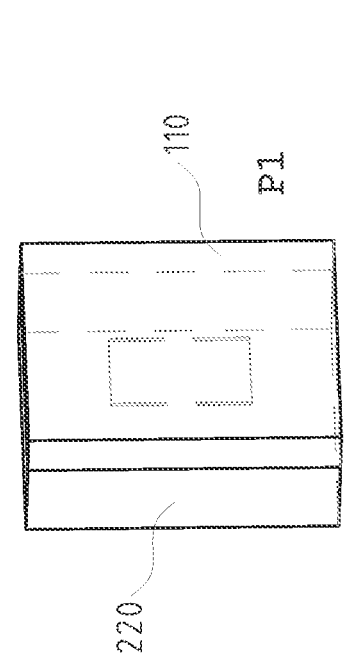
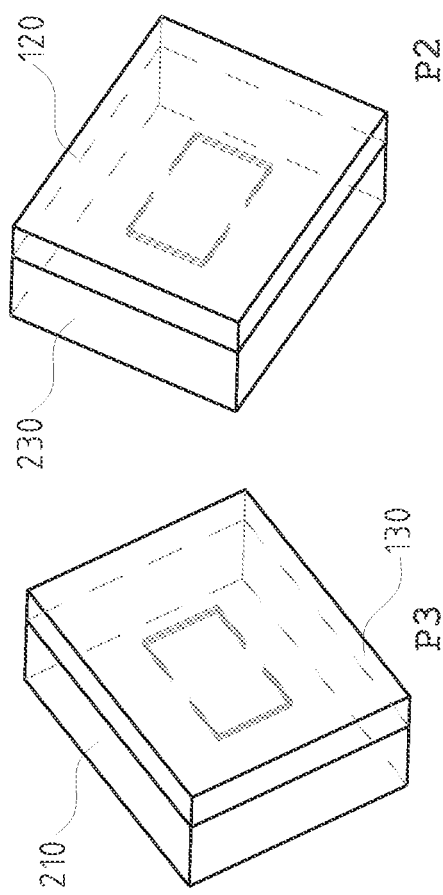
Fig. 3D

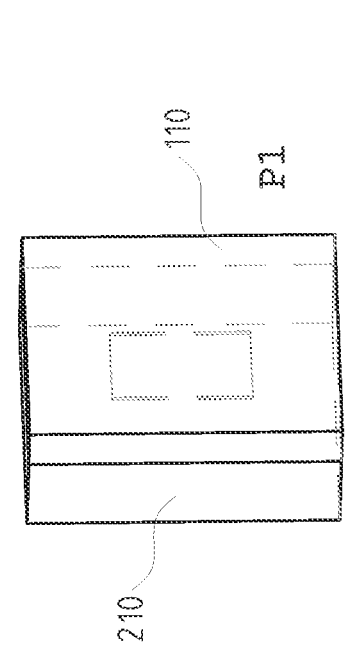
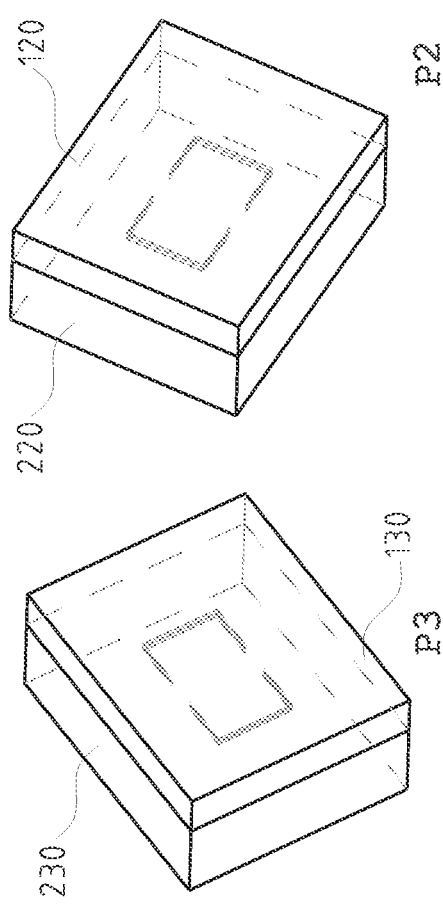
Fig. 3G

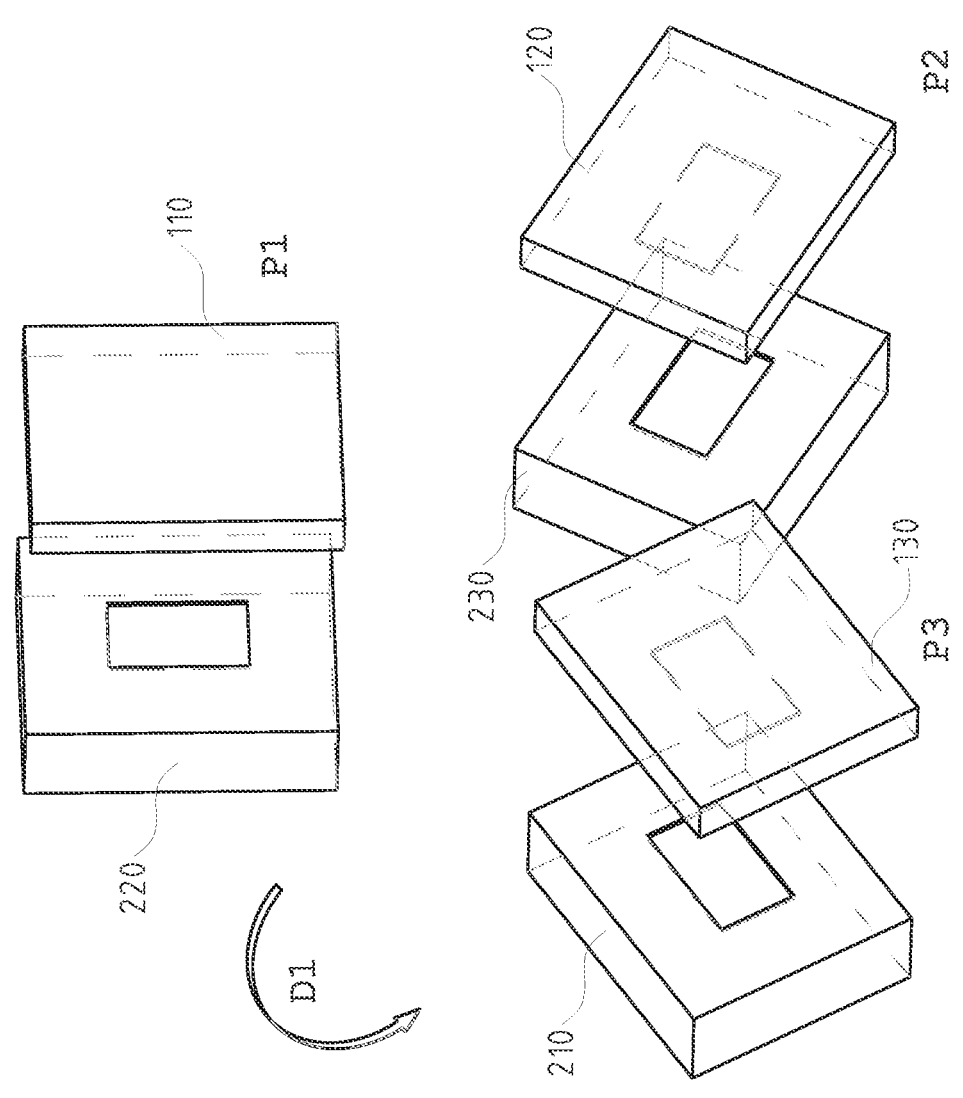

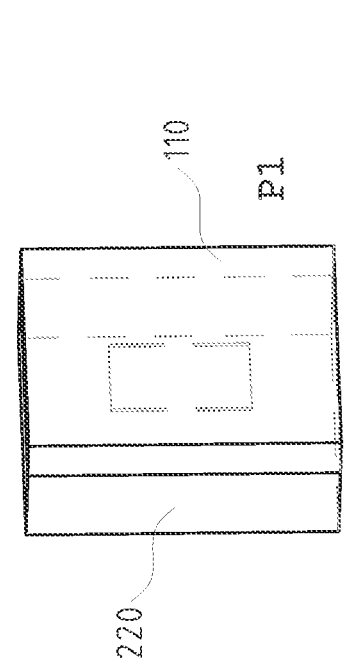
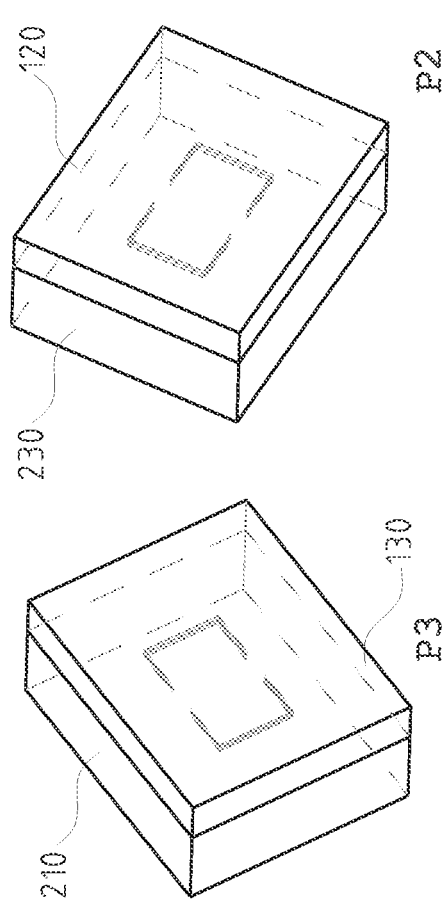
Fig. 3J

400

1K

2K

3K

400

1K

2K

3K

INJECTION MOLDING APPARATUS AND INJECTION MOLDING PROCESS FOR PRODUCING MULTICOMPONENT PLASTICS MOLDINGS

RELATED APPLICATION

The instant application claims priority to German Patent Application 102021006412.7, filed on Dec. 30, 2021, which is incorporated herein by reference.

TECHNICAL FIELD

The disclosure relates to an injection molding apparatus and also to an injection molding process for producing plastics moldings which comprise at least three plastics components.

BACKGROUND

Multicomponent plastics moldings of these kinds may be produced by means of a turntable injection molding apparatus on a multicomponent machine. Turntable injection molding apparatuses have mold plates which can be rotated relative to one another, with one of the mold plates typically being held fixed with respect to rotation in the multicomponent machine, while the other mold plate in the opened state is rotatable relative to the fixed mold plate. In the case of 3K (three-component) injection molding, the rotatable mold plate has three mold nests disposed at 120° relative to one another, these nests each forming cavities for the base element of the molding to be produced and being identical in implementation. The fixed mold plate likewise has three mold nests, which are each provided with a plastics feed (1K and 2K and 3K, respectively), have different designs, and allow the molding of the base element (1K) and the molding-on of the second component (2K) and of the third component (3K), respectively.

The fabrication procedure comprises a successive rotation of the rotatable mold plate relative to the fixed mold plate, with the intermediates (1K base element, 1K base element with molded-on second component 2K, or completed 3K component) located in the cavities of the first mold plate each being repositioned relative to the fixed mold plate, in order for the next fabrication step to be implemented.

Difficulties occur in a process of this kind when, for example, a component is to be molded on at both sides of the base element of the plastics molding.

SUMMARY

An object on which the disclosure is based may be seen that of providing an injection molding apparatus which enables simple and operationally efficient production of at least three-component plastics molding. A further objective of the disclosure is to specify an injection molding process for producing a plastics molding of this kind comprising at least three components, the process making it possible to manufacture one plastics molding for each closing and opening event of the mold plates.

Accordingly, an injection molding apparatus for producing a plastics molding comprising a first component, a second component and a third component has a first mold plate having at least three first mold nests. The injection molding apparatus further comprises a second mold plate having (likewise) at least three second mold nests. In the closed state, the second mold plate cooperates with the first mold plate in the production of the plastics molding, and in the opened state it is rotatable relative to the first mold plate. The at least three second mold nests (of the second mold plate) comprise, in a case A), at least two second mold nests for injection molding the first component and at least one second mold nest for injection molding the third component, or in a case B), at least two second mold nests for injection molding the second component and at least one second mold nest for injection molding the first component.

An injection molding process for producing a plastics molding comprising a first component, a second component, and a third component is implemented on an injection molding apparatus which comprises the first mold plate and a second molding plate, wherein the first mold plate has at least three first mold nests, the second mold plate has at least three second mold nests, and the second mold plate in the closed state cooperates with the first mold plate in the production of the plastics molding, and in the opened state is rotatable relative to the first mold plate. The process comprises a rotating with the second mold plate relative to the first mold in different directions of rotation between one or more successive closing and opening events of the mold plates.

BRIEF DESCRIPTION OF THE DRAWINGS

FIGS. 3A to 3K illustrate steps in an operating sequence for the production of a three-component plastics molding, with FIGS. 3A to 3G showing the starting phase and FIGS. 3H to 3K showing the ongoing cycle of an illustrative production process.

FIG. 4B shows the illustrative plastics molding represented in FIG. 4A in longitudinal and/or cross-sectional representation.

DETAILED DESCRIPTION

Injection Molding Apparatus

Figure 1:
FIG. 1 shows a first mold plate of an illustrative injection molding apparatus in plan view according to a first exemplary embodiment.

As a result of the provision of differently designed mold nests on the second mold plate, it becomes possible to mold-on a component at a side, facing the second mold plate, of a base element of the plastics molding.

According to one exemplary embodiment, the at least three first mold nests (of the first mold plate) comprise at least two first mold nests which each communicate with two plastics feeds for introducing plastic, in the case A), of the second component and of the third component or, in the case B), of the first and second components. In these mold nests, therefore, different plastics components may be molded onto a base element of the plastics molding to be produced, electively. In other words, by virtue of the provision of differently designed mold nests on the first mold plate, it becomes possible to mold-on a component on a side, facing the first mold plate, of a base element of the plastics molding.

The at least three first mold nests here may further comprise at least one first mold nest which communicates with only one plastics feed for introducing plastic, in case A), of the first component, i.e., for example, of the base element, or in the case B), of the third component. In other words, in case A), a first mold nest, for example, serves for producing the base element of the plastics molding, while at least two further mold nests alternately add the second and third components, respectively, to the plastics molding to be produced. In the case B), for example, two first molding cavities serve alternately for producing the base element and for molding the second component onto the base element, while a first mold nest adds the third component to the plastics molding to be produced.

The plastics feeds for the first, second and third components here may be embodied in or on the first mold plate. More particularly, all of the plastics feeds may be embodied in or on the first mold plate.

No plastics feeds for the first, second or third component, for example, may be embodied in or on the second mold plate. More particularly, no plastics feeds at all may be realized in or on the second mold plate. It is, however, also possible for plastics feeds for the first and/or second and/or third component to be incorporated in the second mold plate. More particularly, from aspects of space and/or cost, it may be advantageous if, in case A), plastics feeds for the first and second components are embodied in or on the first mold plate, and a plastics feed for the third component is embodied in or on the second mold plate.

The injection molding apparatus may be configured in operation to switch the direction of rotation of the second mold plate relative to the first mold plate after one or more closing and opening events. More particularly there may be a switch of direction of rotation after each closing opening event, the angle of rotation always being 120° in each case.

The injection molding apparatus may be configured to produce a plastics molding wherein the first component (base element, for example) is disposed between the second component and the third component.

Injection Molding Process

The process may comprise a rotating of the second mold plate relative to the first mold plate in alternating directions of rotation after each closing and opening event.

The process may be configured, for example, to produce one plastics molding per closing and opening event of the mold plates. Accordingly the process exhibits high efficiency with regard to component fabrication.

The injection molding process may comprise injection molding of the first component to fabricate a 1K intermediate, of the second component onto a previously fabricated 1K intermediate to fabricate a 1K+2K intermediate, and of the third component onto a previously fabricated 1K+2K intermediate to fabricate the plastics molding. The process here may be configured such that the 1K+2K intermediate remains in a first mold nest of the first molding plate when the second mold plate is rotated relative to the first mold plate.

The process may further be implemented such that 1K+2K intermediates and completed 3K molded components are produced alternately in two mold nests of the first mold plate. As a result, the components may also be withdrawn alternately at different mold nests of the first mold plate.

The process may comprise the injection molding of the first component to fabricate a 1K intermediate, of the second component onto a previously fabricated 1K intermediate to fabricate a 1K+2K intermediate, and of the third component onto a previously fabricated 1K+2K intermediate to fabricate the plastics molding. In this case the 1K+2K intermediate may be located in a second mold nest of the second mold plate on rotation of the second mold plate relative to the first mold plate.

The process in this case may be implemented such that 1K intermediates and 1K+2K intermediates are produced alternately in two mold nests of the first mold plate.

For example, an injection molding process disclosed here may comprise the following steps:
a) closing the mold plates;
b) injection molding the first component to fabricate a 1K intermediate, the second component onto a previously fabricated 1K intermediate to fabricate a 1K+2K intermediate, and the third component onto a previously fabricated 1K+2K intermediate to fabricate the plastics molding;
c) opening the mold plates;
d) withdrawing the plastics molding;
e) rotating the second mold plate relative to the first mold plate in a direction of rotation;
f) closing the mold plates;
g) injection molding the first component to fabricate a 1K intermediate, the second component onto the previously fabricated 1K intermediate to fabricate a 1K+2K intermediate, and a third component onto the previously fabricated 1K+2K intermediate to fabricate a further plastics molding;
h) opening the mold plates;
i) withdrawing the further plastics molding;
j) rotating the second mold plates relative to the first mold plate in the opposite direction to the direction of rotation; and
k) continuing the operating sequence with step a).

In the text below, exemplary embodiments are elucidated with reference to the drawings. Parts identical or corresponding to one another are provided with the same reference signs. Features of the exemplary embodiments represented may be selectively combined with one another, provided they are not alternative features or features which in technical terms are mutually exclusive. Furthermore, features of the exemplary embodiments may be selectively omitted, provided they are not described as mandatory features in the description.

Figure 4A:
FIG. 4A shows an illustrative three-component plastics molding in perspective plan view.
Figure 48:
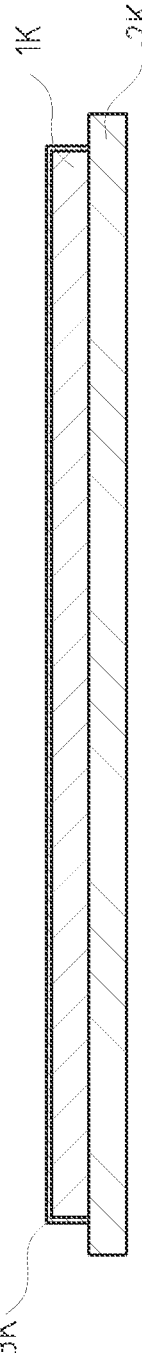

According to FIGS. 4A and 4B, a multicomponent plastics molding 400 may comprise a first component 1K, a second component 2K, and a third component 3K. The multicomponent plastics molding 400 therefore has at least three plastics components. It is referred to below as the 3K plastics molding 400, with this reference not precluding the presence of further plastics components as well (i.e., for example a fourth plastics components, a fifth plastics component, etc.) in the 3K plastics molding.

The first plastics component 1K may be, for example, the base element of the 3K plastics molding 400. The first plastics molding 1K may consist, for example, of a transparent plastics material and may have a flat implementation, for example. Likewise possible is an opaque first plastics component 1K.

The second plastics component 2K may be injection-molded on a first main side of the first component 1K. For example, the second plastics components 2K may be an assembly structure (e.g., a so-called black margin) by means of which the first plastics component 1K can be mounted in an installation position (e.g., in a bodywork opening of a motor vehicle). The second plastics component 2K may cover the entire area of the first main surface of the first plastics component 1K, or else a partial area of said surface (in the form, for example, of separate local assembly points or optical elements, or in the form of a surrounding frame).

The third plastics component 3K may extend, for example, over a second main surface—opposite the first main surface—of the first plastics component 1K and also, optionally, over side-wall regions of the first plastics component 1K. The third plastics component 3K may be, for example, a full-area surface coating (e.g., finish) of the first plastics component 1K. For example, high-transparency PU plastics may be used, producing an optical depth effect and surface protection, for example. The third plastics component 3K, however, may also be embodied in a form other than that represented in FIGS. 4A-4B. For example, the third plastics component 3K may likewise be a structural component such as, for example, a frame, a reinforcing structure, etc., in which case, in order to avoid repetition, reference is made to the description of the second plastics component 2K.

The 3K plastics molding 400 may be, for example, a window, e.g., a vehicle window, or a bodywork part and/or glazing part of a vehicle, for example. More particularly it may also be a design part or facing part for the interior of a vehicle, especially a design part or facing part which is touched by an occupant, for example, and is therefore to be protected from signs of use, for which the third component 3K is required.

FIG. 1 shows a first example of a first mold plate 100 of an injection molding apparatus, in plan view. In the example represented here, the first mold plate 100 has three mold nests 110, 120, 130, which are represented schematically in FIG. 1. The mold nests 110, 120, 130 may be oriented in a radial direction to a centerpoint M of the first mold plate 100, and may be disposed peripherally at 120° from one another.

The mold nest 110 may be a 1K mold nest, in which the first component 1K of the plastics molding 400 is molded. The mold nest 120 and the mold nest 130 may be provided for the injection molding of the second component 2K, and they enable a plastics feed for the molding-on of the third component 3K.

In terms of their contour face, the mold nests 120 and 130 may be implemented identically, and may differ from the contour face of the mold nest 110.

As represented in FIG. 1, the mold nest 110 communicates with a plastics feed 115 for introducing plastic of the first component 1K. The mold nests 120 and 130 each have a plastics feed 125, 135 for introducing plastic of the second component 2K. Additionally there are plastics feeds 128 and 138 for supplying plastic of the third component 3K.

The plastics feeds 128, 138 may attach for example—similarly to a film gate—at a marginal region of the mold nests 120 and 130, respectively, thus preventing plastic of the third component 3K from getting in between the contour face of the mold nest 120 or 130 for injection molding of the second component 2K and of the injection molded second component 2K of the plastics molding. The plastic feeds 115, 125, 135 may attach to the respective mold nests 110, 120 and 130, for example, in a central or outer-marginal region of the respective contour faces.

The plastics feeds 115, 125, 135 for molding-on the first component 1K and the second component 2K may be implemented as hot runners. The plastics feeds 128, 138 for supplying the third component 3K may likewise be implemented as hot runners; alternatively, other supply technologies, examples being mixing systems for supplying (i.e., flooding the intermediate product with), for example, low-viscosity PU plastics, are also possible.

All of the plastics feeds 115, 125, 135, 128, 138 may be incorporated in the first mold plate 100 and may serve to pass liquid plastics compound to the mold nests during the filling event. In particular, the feed of the third component 3K may, alternately, also be incorporated in the second mold plate 200 (for example, if the feed of the third component 3K is implemented by means of PU flooding). In that case the feed unit is incorporated only in the 3K mold nest 230, since that cavity moves with the mold nests 120 and 130 through the rotation of the second mold plate 200. This enables an inexpensive and space-saving arrangement, since, in comparison to the variant represented in FIG. 1, there is one 3K supply unit less and there is also more space available on the first mold plate 100 for the 2K plastics feed 125, 135, which frequently, as hot runners, must be incorporated into the first mold plate 100 each with a plurality of distributed injection points to the 2K mold nests 120, 130. Generally speaking, however, it is also possible for the feeds of the first component K1 and/or of the second component K2 to be incorporated in the second mold plate 200.

The plastics of the first component 1K, of the second component 2K and of the third component 3K may each be different from one another, in which case the difference may lie, for example, in the choice of material and/or in the optical properties (transparency, color, etc.).

Figure 2:
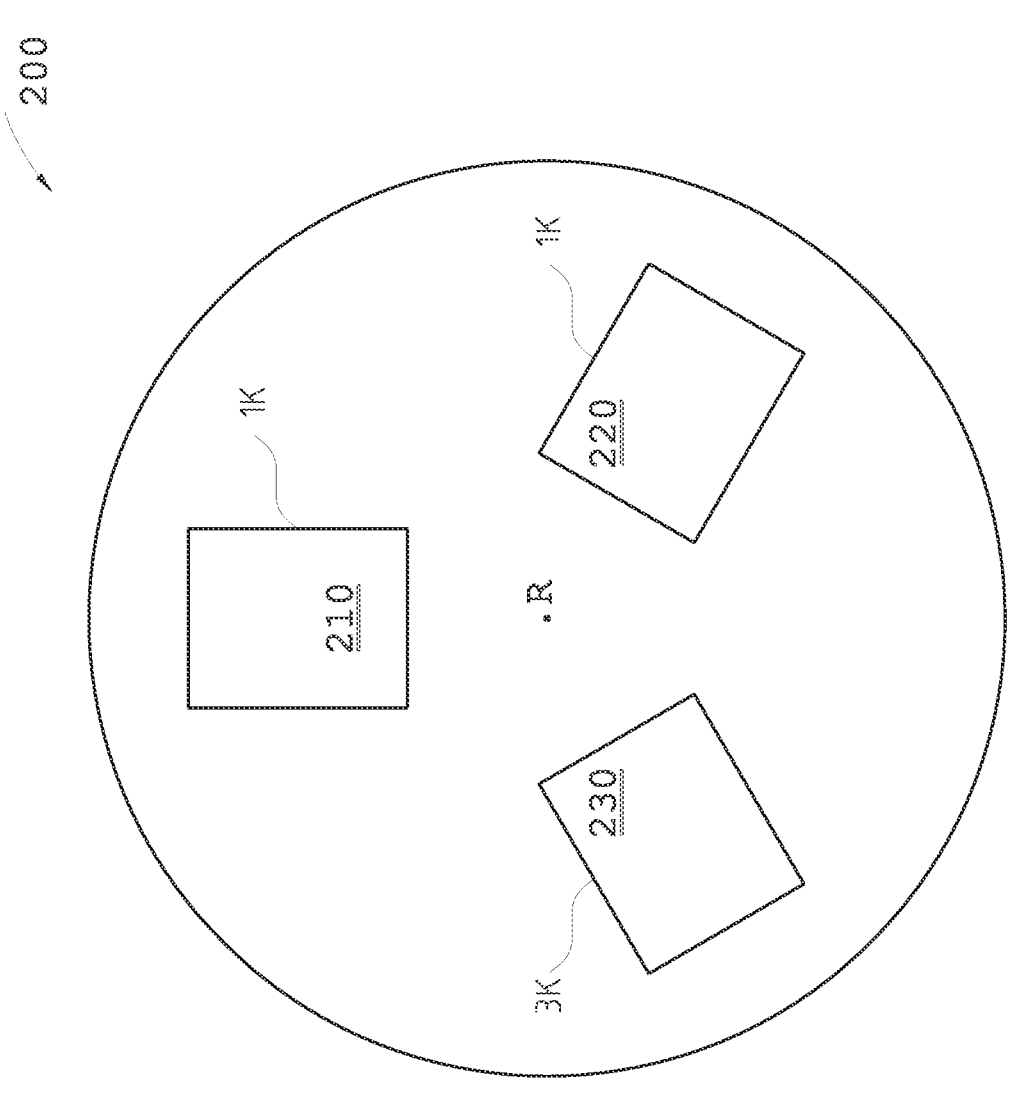
FIG. 2 shows a second mold plate of an illustrative injection molding apparatus in plan view according to the first exemplary embodiment.

The second mold plate 200 (see FIG. 2) likewise has a mold nest 210, a mold nest 220, and a mold nest 230. The mold nest 210 and the mold nest 220 may have an identical contour face for the injection molding of the first component 1K. In terms of its contour face, the mold nest 230 is designed differently than the mold nests 210 and 220. In the example represented here, the mold nest 230 is shaped with a contour face for the molding-on of the third component 3K.

The injection molding comprising the mold plates 100, 200 may be a turntable mold. This means that the two mold plates 100, 200 are mounted on die plates (not shown) which can be displaced axially relative to one another, and which may also (in the opened mold position) be rotated relative to one another. Typically the first mold plate 100 is mounted in such a way as to be fixed with respect to rotation and optionally also fixed in terms of position in a turntable injection molding machine, whereas the second mold plate 200 is implemented such as to be rotatable and optionally axially displaceable relative to the first mold plate 100. The axis of rotation passes through the rotation point R of the second mold plate 200 and the centerpoint M of the first mold plate 100.

Figure 3B:
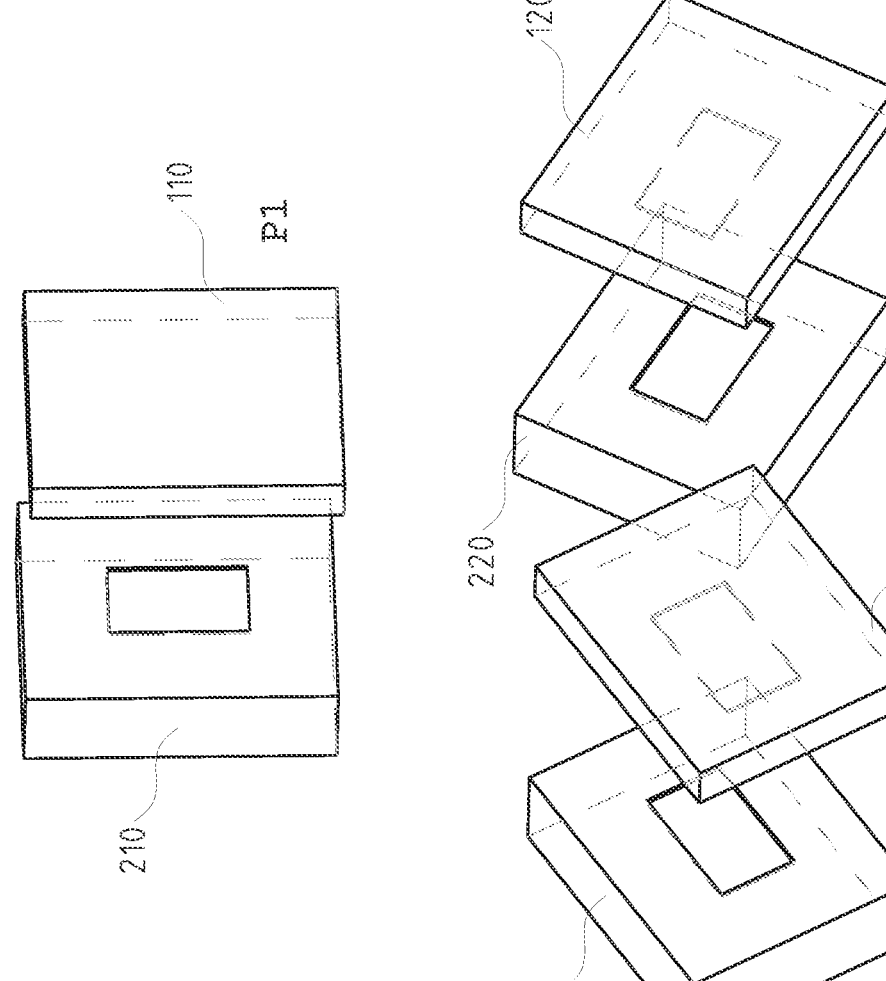
Figure 3C:
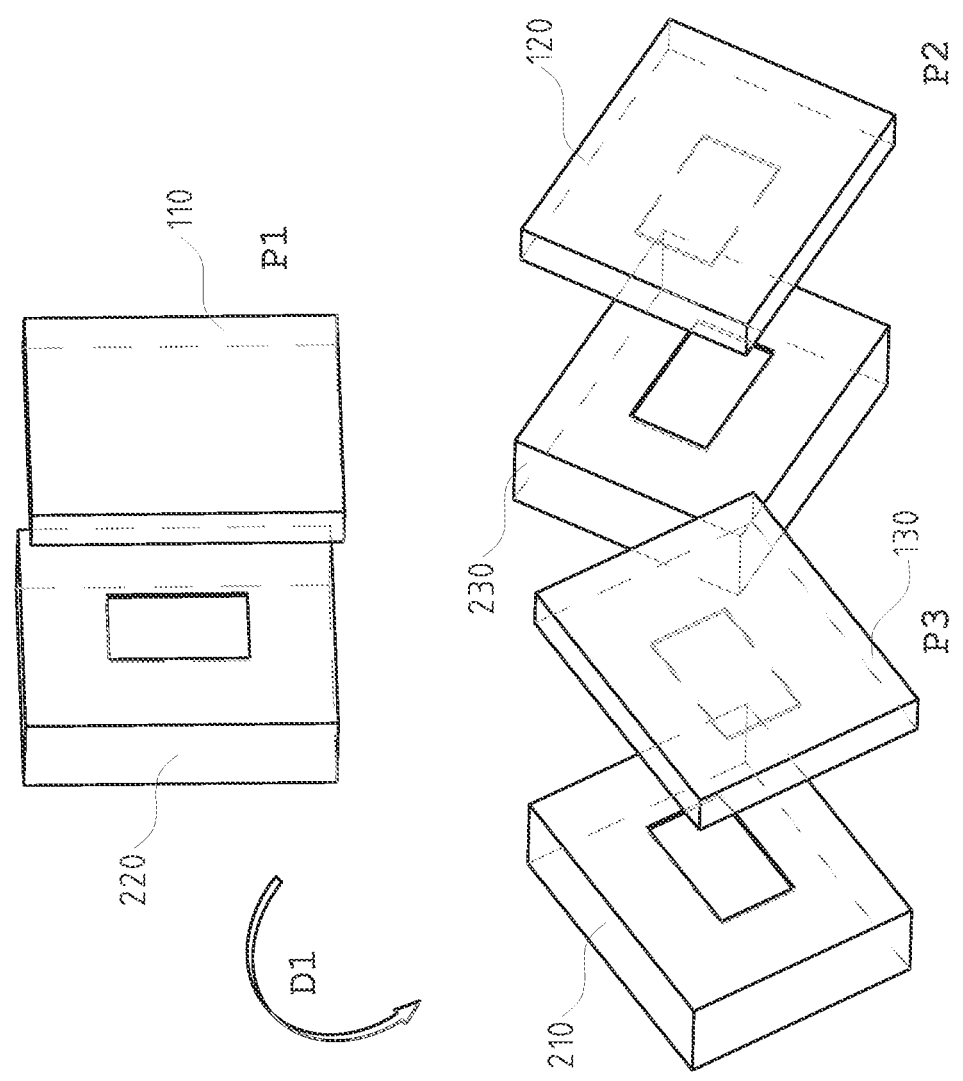
Figure 3E:
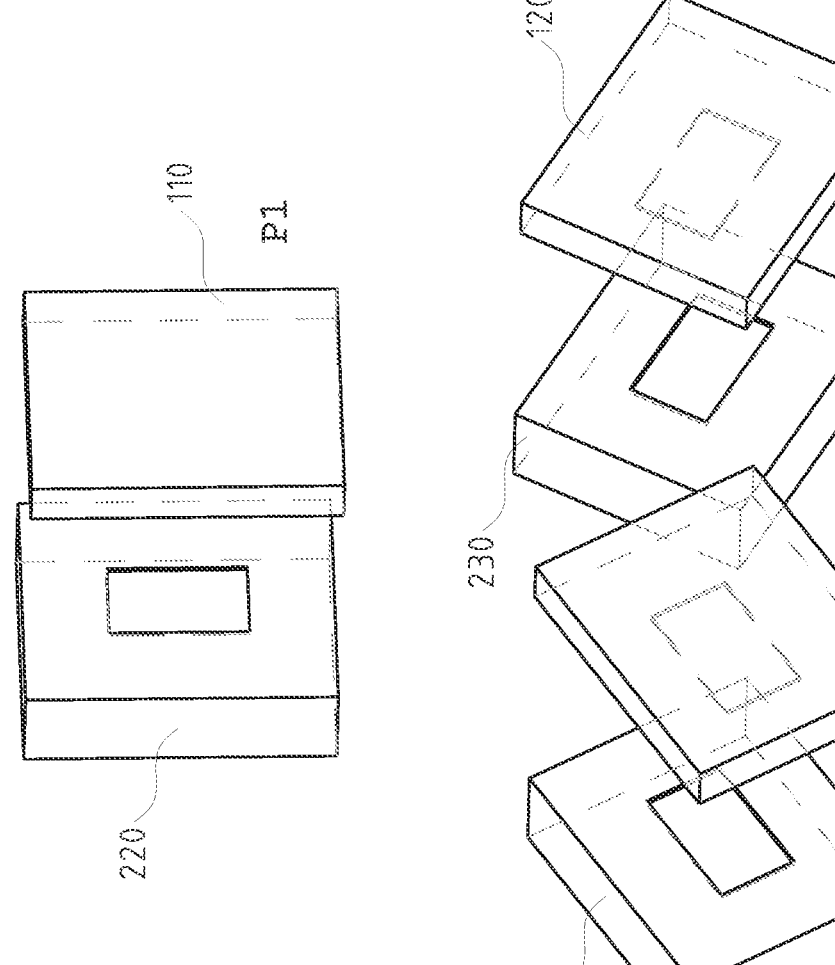
Figure 3F:
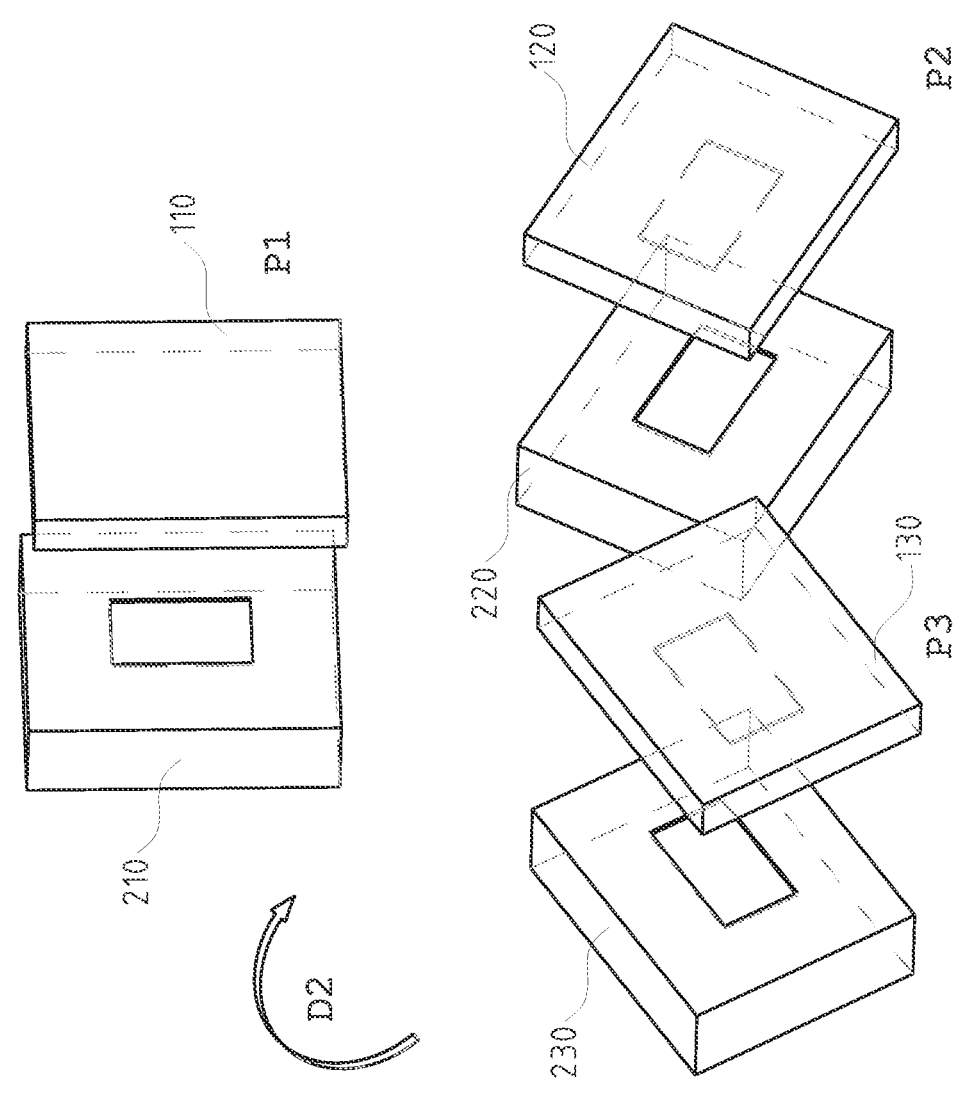
Figure 3H:
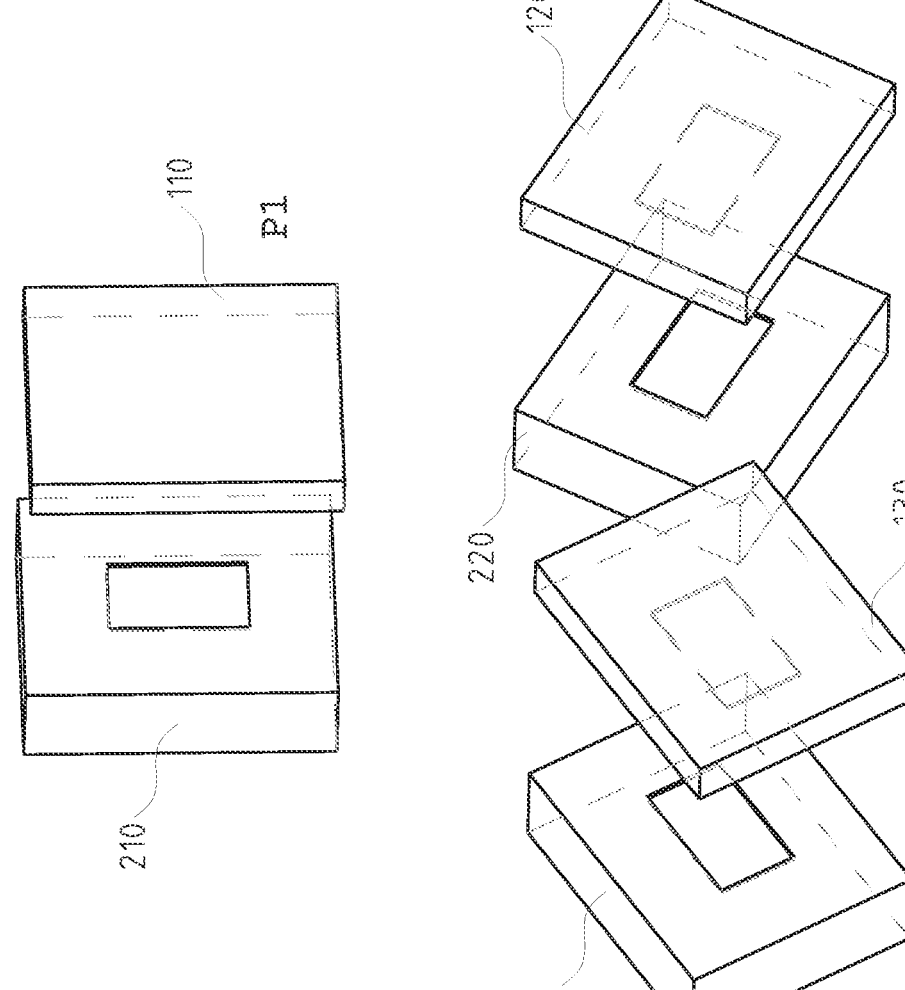
Figure 3K:
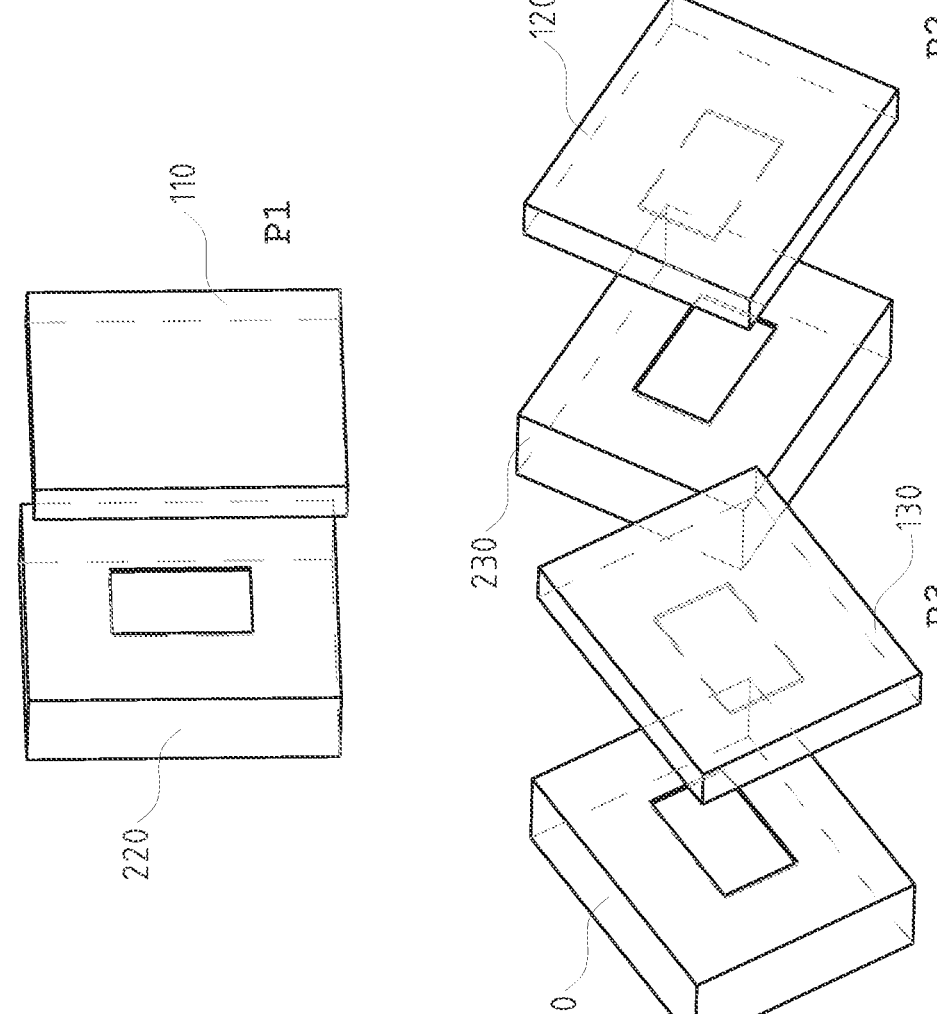

FIGS. 3A to 3K illustrate, schematically and in an exemplary way, production steps of a process for producing a 3K plastics molding, using the example of the mold plates 100, 200. To simplify the representations, only the mold nests 110, 120, 130 and, respectively, 210, 220, 230 have been represented, but not the mold plates 100, 200. All of FIGS. 3A and 3K are views in oblique perspective onto the back side of the first mold plate 100 (not represented). Likewise not represented are the plastics feeds 115, 125, 135, 128, 138 to the mold nests 110, 120, 130 of the first mold plate 100.

FIG. 3A shows the injection molding apparatus in the closed state. Respective cavities are formed between the mold nests 110, 210 and 120, 220 and 130, 230. In the cavity between the mold nests 110, 210, a first component 1K (1K intermediate) of plastics molding 400 is fabricated. The cavities between the mold nests 120, 220 and 130, 230 are empty in the starting phase of the production sequence.

The mold nests 210, 220, 230 may be pan-shaped mold nests, while the mold nests 110, 120, 130 may realize molding core-shaped mold nests. The mold nests 210, 220, 230 may likewise be molding core-shaped mold nests, whereas the mold nests 110, 120, 130 may realize pan-shaped mold nests—an example of this kind will be elucidated in more detail with reference to FIGS. 5 and 6.

In the text below, the position of the mold nest 110 is identified as P1, the position of the mold nest 120 as P2, and the position of the mold nest 130 as P3. These positions P1 to P3 are fixed.

FIG. 3B shows the opening of the mold plate 100, 200 (not represented). As a result, the mold nests 110, 210, 120, 220 and 130, 230 are separated from one another. The first component 1K (1K intermediate) produced in FIG. 3A remains in the mold nest 210.

With reference to FIG. 3C, the second mold plate 200 is rotated in a first direction of rotation D1 (see arrow) relative to the first mold plate 100. The rotation is made by 120°. Where are there more than three mold nests provided per mold plate, the angle of rotation is likewise 120°.

The two mold plates 100, 200 are subsequently closed (see FIG. 3D). As a result, cavities are formed between the mold nests 110, 220 and 130, 210 and 120, 230.

At position P1 between the mold nests 110, 220, a further first component (1K intermediate) is fabricated. In the same working step, at position P3, the second component 2K is molded onto the 1K intermediate in the mold nest 210. At position P2, in the starting phase, no injection molding event is implemented in this working step.

The two mold plates 100, 200 are subsequently opened again; see FIG. 3E. The first component 1K (1K intermediate) just fabricated remains in the mold nest 220 on the rotation side of the injection molding apparatus. The 1K+2K intermediate, produced in FIG. 3D by molding of the second component 2K onto the 1K intermediate, remains in the mold nest 130, i.e. at position P3 of the fixed side (also referred to as die side) of the injection molding apparatus.

As represented in FIG. 3F, the second mold plate 200 is subsequently rotated back in an opposite direction D2 to the direction of rotation D1. As a result, the mold nests 110, 210 (at position P1), 120, 220 (at position P2), and 130, 230 (at position P3) regain their opposite positioning.

In the following working step of FIG. 3G, after closing of the mold plates, at position P1, a first component 1K (1K intermediate) is fabricated in turn. At position P2, a 1K+2K intermediate is fabricated—that is, the second component 2K is molded onto the previously fabricated 1K intermediate. At position P3, the third component 3K is molded onto the previously fabricated 1K+2K intermediate, thereby generating a completed 3K plastics molding.

As represented in FIG. 3H, the mold plates 100, 200 are subsequently opened. The 1K intermediate produced in the preceding working step (FIG. 3G) remains on the rotation side in the mold nest 210. The 1K+2K intermediate previously fabricated at position P2 remains in the mold nest 120 on the fixed side of the injection molding apparatus. At position P3, the completed 3K plastics molding is withdrawn as a component.

The mold plate 200 is then rotated in direction of rotation D1 by 120°, see FIG. 3I. This brings the 1K intermediate into position P3, and the mold nest 230, for the production of the third component 3K, passes to position P2 in opposition to the mold nest 120, in which the 1K+2K intermediate is located.

After closing of the mold plates 100, 200, in FIG. 3J the following injection molding operations are implemented: at position P1, component 1K is injected for the fabrication of a 1K intermediate. At position P3, a 1K+2K intermediate is fabricated by injection of the second component 2K. At position P2, a completed 3K plastics molding is produced by injection of the third component 3K onto the already fabricated 1K+2K intermediate.

This means that in FIG. 3J, the positioning of the mold plates 100, 200 is identical to that in FIG. 3D, but in the ongoing cycle (FIG. 3J), in contrast to the starting phase (FIG. 3D), the third component 3K is molded at position P2, rather than a "blank operation" being implemented.

The mold plates 100, 200 are subsequently opened (FIG. 3K). Again, the 1K intermediate remains on the rotation side in the mold nest 220. The 1K+2K intermediate position P3 remains in the mold nest 130 on the fixed side of the injection molding apparatus. At position P2, the completed 3K plastics molding is withdrawn as a component.

In the ongoing cycle, the operation then continues in the manner represented in FIG. 3F, with the second mold plate 210 being rotated back—D2.

From the foregoing description it is evident that in this exemplary embodiment, at position P1, a first component (i.e., a 1K intermediate) is fabricated in each working step. At positions P2 and P3, each alternately, 1K+2K intermediates and completed 3K molded components are produced. As a result of the rotating of the second mold plate 200 in direction of rotation D1 and the rotating-back of the second mold plate 200 in the counterrotation direction D2, the mold nest 230, for the molding-on the third component 3K, is always exactly in the rotational positioning (position P2 or position P3) in which the 1K+2K intermediate has just been fabricated (which always remains on the fixed side (first mold plate 100), i.e., is not moved).

In this exemplary embodiment, in other words, the 1K intermediate is produced at position P1 and then moved either in direction of rotation D1 or in counter rotational direction D2 to the positions P3 or P2, respectively. Conversely, the 1K+2K intermediate remains on the fixed side (mold plate 100) of the injection molding apparatus, meaning that it is not moved throughout the operating sequence. Withdrawal of the component takes place alternately at positions P2 and P3.

In the ongoing cycle, in each work-cycle (closing and opening event of the mold plates 100, 200), a component is withdrawn i.e., one completed 3K plastics molding is produced per work-cycle.

Figure 5:
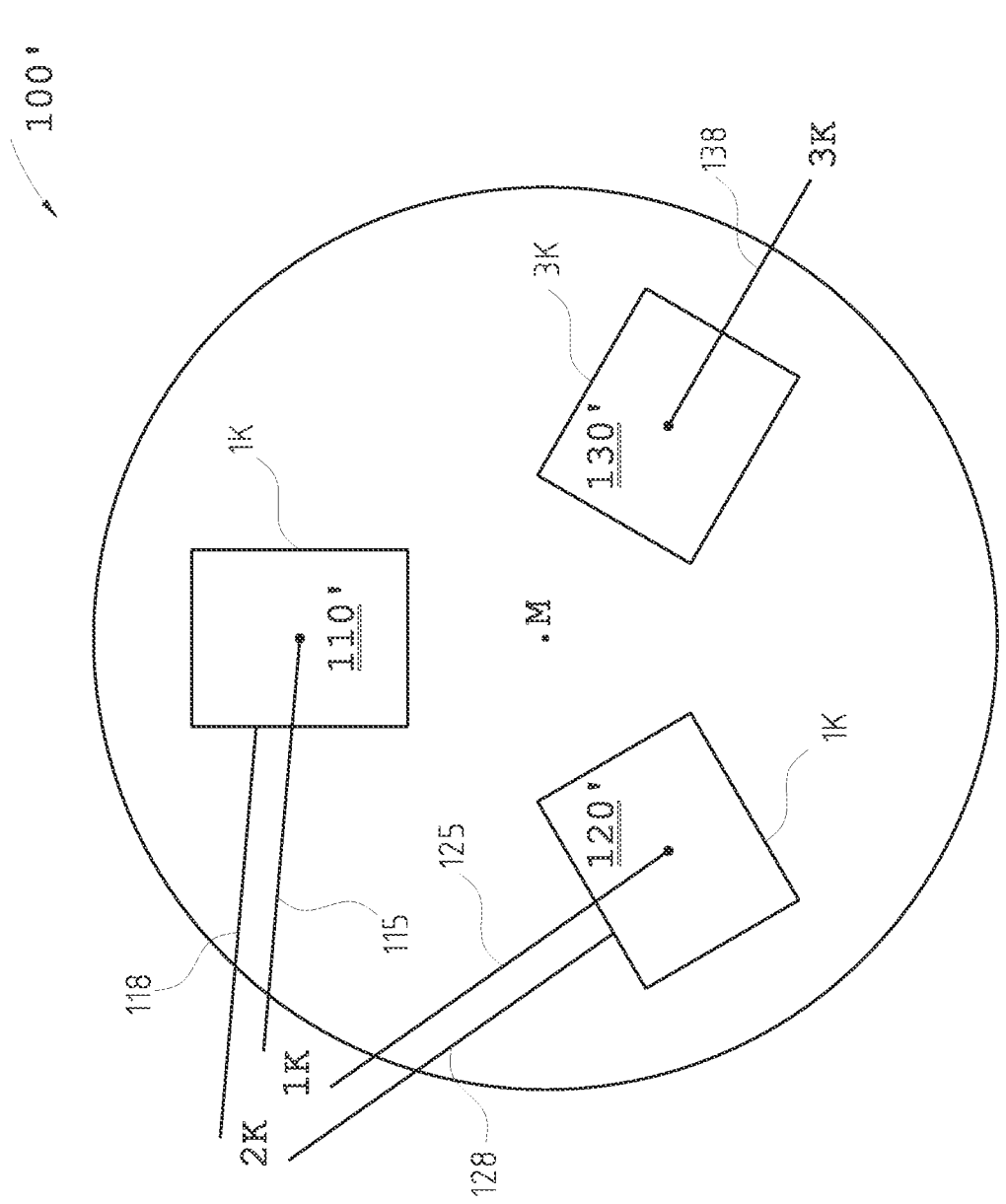
FIG. 5 shows a first mold plate of an illustrative injection molding apparatus in plan view according to a second exemplary embodiment.
Figure 6:
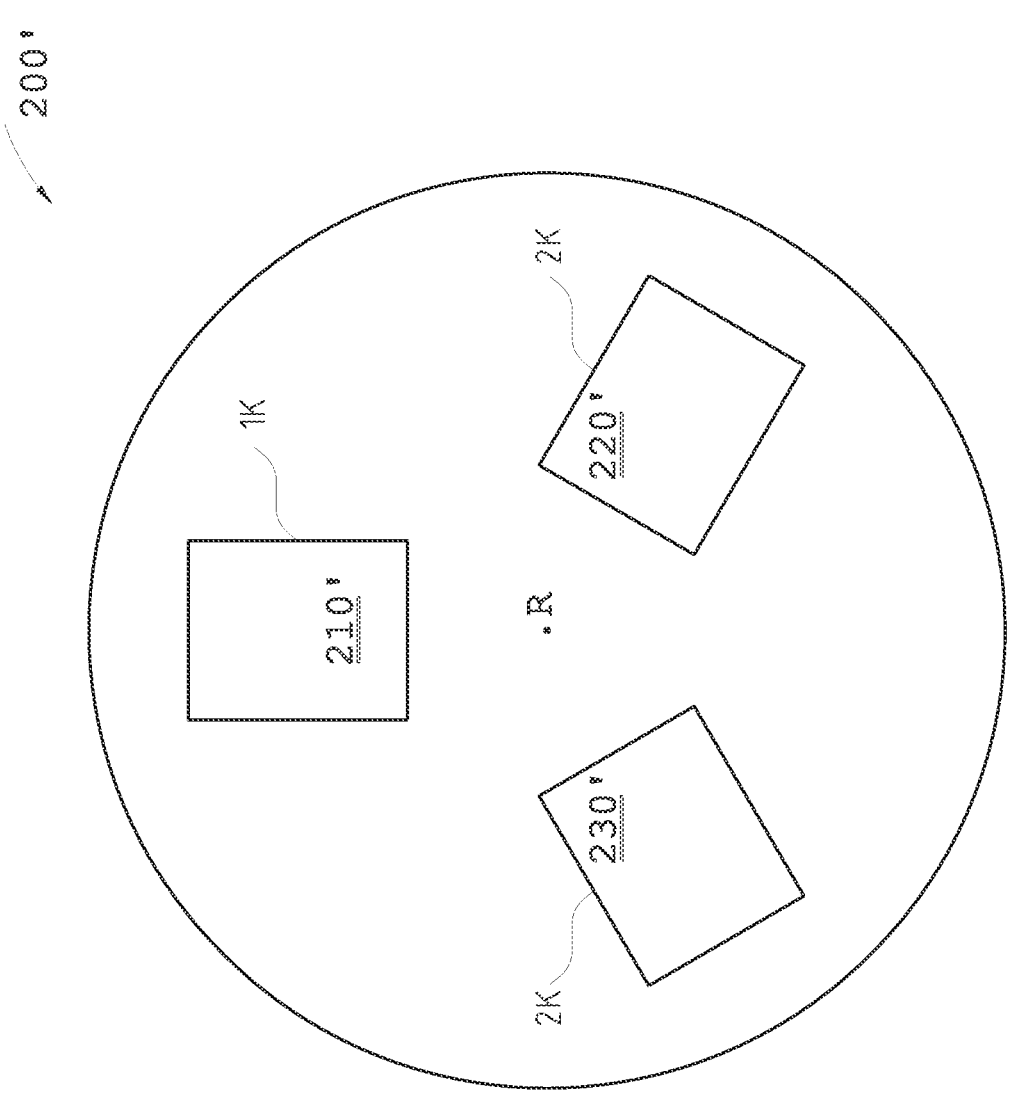
FIG. 6 shows a second mold plate of an illustrative injection molding apparatus in plan view according to the second exemplary embodiment.

FIGS. 5 and 6 show a first mold pate 100' and a second mold plate 200' of an illustrative injection molding apparatus in plan view, according to a second exemplary embodiment.

The second exemplary embodiment may differ from the first exemplary embodiment (FIGS. 1 and 2) in that the first mold plate 100' has mold nests 110', 120', 130' which, in comparison to the mold nests 110, 120, 130 of the first exemplary embodiment, form different cavities (i.e., contour faces). For example, the mold nest 110' forms a 1K cavity, the mold nest 120' likewise forms a 1K cavity, and the mold nest 130' forms a 3K cavity. Here, the mold nests 110', 120', 130' may be pan-shaped mold nests; in other words, the first mold plate 100' may be formed as a pan mold plate.

With regard to the second mold plate 200', the second exemplary embodiment may differ from the first exemplary embodiment (FIGS. 1 and 2) in that the second mold plate 200' has mold nests 210', 220', 230' which form different cavities (i.e., contour faces) in comparison to the mold nests 210, 220, 230. For example, the mold nest 210' forms a 1K cavity, the mold nest 220' forms a 2K cavity, and the mold nest 230' likewise forms a 2K cavity (i.e., provides correspondingly shaped contour faces). Here, the mold nests 210', 220', 230' may be molding core-shaped mold nests, meaning that the second mold plate 200' may be formed as a molding-core plate.

As represented in FIG. 5, the mold nests 110', 120' may be supplied with plastics feeds (e.g., hot runners) 115, 118 and 125, 128, respectively, for the introduction of the first and second plastics components, while a 3K feed 138 attaches to the mold nest 130'. With regard to the feeds (more particularly their implementation and incorporation into molds plates 100' or else 200'), reference is made to the observations above.

The process for producing the plastics molding 400 by means of the mold plates 100', 200' runs largely in analogy to the process elucidated with reference to FIGS. 3A-3K, and so, in order to avoid repetition, reference is made to the description above. Here as well, in particular, between one or more successive closing and opening events of the mold plates 100', 200', there is a rotating of the second mold plate 200' relative to the first mold plate 100' in a different direction of rotation. Attention is drawn to the following particularities:

First of all, a 1K component is fabricated between the mold nests 110' and 210'. On the subsequent opening of the mold, the 1K component remains (in contradiction to the situation in the case of the first exemplary embodiment) in the first (e.g., pan-shaped) mold nest 110'.

The second mold plate 200' is subsequently rotated by 120° (in an opposite direction to the direction of rotation D1 represented in FIG. 3C). As a result, the mold nest 230' moves into opposition to the mold nest 110'. The mold is closed, and in the mold nest 230' the second component 2K is molded onto the first component 1K. The molding-on of the second component 2K here takes place in the second mold plate 200'; i.e., in comparison to the first exemplary embodiment, the plastics molding 400 is produced in a manner turned by 180° in the mold 100', 200'. In the starting phase, the mold nest 220' which is opposite the 3K mold nest 130' is still empty at this point in time.

Following the production of 1K+2K intermediate between the mold nests 110' and 230', the mold is opened and the second mold plate 200' is rotated back by 120°, so bringing the mold nest 230' back into opposition to the mold nest 130'. In contrast to the situation in the first exemplary embodiment, in the course of the rearward rotation, the 1K+2K intermediate in the second mold plate 200' (in the mold nest 230') moves with it.

The mold 100', 200' is subsequently closed and the third component 3K is molded onto the 1K+2K intermediate. In this case the 1K+2K intermediate is located in the mold nest 230'; the third component 3K is molded on (in contrast to the situation in the first exemplary embodiment) in the first mold plate in the mold nest 130'.

In the ongoing cycle, the mold nests 220', 230' of the second mold plate 200' always perform alternate transportation of a prefabricated 1K+2K intermediate to the mold nest 130' of the first mold plate 100', in which the plastics molding 400 is then completed and from which it is subsequently withdrawn. At the same time, in first mold nests 100', 120' of the first mold plate 100', 1K intermediates and 1K+2K intermediates are each produced alternately.

Common to the two exemplary embodiments is that the process comprises the steps of:

a) closing the mold plates 100, 100' and 200, 200';

b) injection molding the first component 1K to fabricate a 1K intermediate, the second component 2K onto a previously fabricated 1K intermediate to fabricate a 1K+2K intermediate, and the third component 3K onto a previously fabricated 1K+2K intermediate to fabricate the plastics molding 400;

c) opening the mold plates 100, 200 and 100', 200';

d) withdrawing the plastics molding 400;

e) rotating the second mold plate 200, 200' relative to the first mold plate 100, 100' in a direction of rotation;

f) closing the mold plates 100, 200 and 100', 200';

g) injection molding the first component 1K to fabricate a 1K intermediate, the second component 2K onto the previously fabricated 1K intermediate to fabricate a 1K+2K intermediate, and a third component 3K onto the previously fabricated 1K+2K intermediate to fabricate a further plastics molding (400);

h) opening the mold plates 100, 200 and 100', 200';

i) withdrawing the further plastics molding 400;

j) rotating the second mold plates 200, 200' relative to the first mold plate 100, 100' in the opposite direction to the direction of rotation; and k) continuing the operating sequence with step a).

The processes described and also the injection molding apparatuses described may be extended analogously to more than three plastics components. It is essential that the injection molding process includes in the ongoing cycle a cyclical switching of the direction of rotation of the second mold plate.

What is claimed is:

1. An injection molding process for producing a plastics molding comprising a first component, a second component, and a third component by means of an injection molding apparatus which comprises a first mold plate and a second mold plate, wherein the first mold plate has at least three first mold nests, the second mold plate has at least three second mold nests, and the second mold plate in a closed state cooperates with the first mold plate in the production of the plastics molding and in an opened state is rotatable relative to the first mold plate; wherein the injection molding process, between one or more successive closing and opening events of the first mold plate and the second mold plate, comprises a rotating of the second mold plate relative to the first mold plate in a different direction of rotation such that after a first closing and opening event, the second mold plate is rotated relative to the first mold plate in a first direction of rotation and after a second closing and opening event, the second mold plate is rotated relative to the first mold plate in a second direction of rotation opposite the first direction of rotation.

2. The injection molding process as claimed in claim 1, wherein the injection molding process is configured to produce one of the plastics molding per closing and opening event of the first mold plate and the second mold plate.

3. The injection molding process as claimed in claim 1, wherein the injection molding process comprises injection molding of the first component to fabricate a 1K intermediate, of the second component onto a previously fabricated 1K intermediate, to fabricate a 1K+2K intermediate, and of the third component onto a previously fabricated 1K+2K intermediate to fabricate the plastics molding, with the 1K+2K intermediate remaining in a first mold nest of the first mold plate on rotation of the second mold plate relative to the first mold plate.

4. The injection molding process as claimed in claim 1, wherein the injection molding process comprises injection molding of the first component to fabricate a 1K intermediate, of the second component onto a previously fabricated 1K intermediate, to fabricate a 1K+2K intermediate, and of the third component onto a previously fabricated 1K+2K intermediate to fabricate the plastics molding, with 1K+2K intermediates and plastics moldings being produced alternately in two mold nests of the first mold plate, the two mold nests having identically shaped contour faces.

5. The injection molding process as claimed in claim 1, wherein the injection molding process comprises injection molding of the first component to fabricate a 1K intermediate, of the second component onto a previously fabricated 1K intermediate, to fabricate a 1K+2K intermediate, and of the third component onto a previously fabricated 1K+2K intermediate to fabricate the plastics molding, with the 1K+2K intermediate being located in a second mold nest of the second mold plate on rotation of the second mold plate relative to the first mold plate.

6. The injection molding process as claimed in claim 5, wherein 1K intermediates and 1K+2K intermediates are produced alternately in two mold nests of the first mold plate, the two mold nests having identically shaped contour faces.

7. The injection molding process as claimed in claim 1, wherein the injection molding process comprises the steps of:

a) closing the first mold plate and the second mold plate;

b) injection molding the first component to fabricate a 1K intermediate, the second component onto a previously fabricated 1K intermediate to fabricate a 1K+2K intermediate, and the third component onto a previously fabricated 1K+2K intermediate to fabricate the plastics molding;

c) opening the first mold plate and the second mold plate;

d) withdrawing the plastics molding;

e) rotating the second mold plate relative to the first mold plate in the first direction of rotation;

f) closing the first mold plate and the second mold plate;

g) injection molding the first component to fabricate a second 1K intermediate, the second component onto the previously fabricated second 1K intermediate to fabricate a second 1K+2K intermediate, and the third component onto the previously fabricated second 1K+2K intermediate to fabricate a further plastics molding;

h) opening the first mold plate and the second mold plate;

i) withdrawing the further plastics molding;

j) rotating the second mold plate relative to the first mold plate in the second direction of rotation; and k) continuing an operating sequence with step a).

8. The injection molding process as claimed in claim 1, wherein the injection molding process, between the one or more successive closing and opening events of the first mold plate and the second mold plate, comprises a rotating of the second mold plate relative to the first mold plate in an alternately reversing direction of rotation.

9. The injection molding process as claimed in claim 1, wherein the at least three first mold nests comprise at least two first mold nests which each communicate with two plastics feeds.

10. An injection molding process for producing a plastics molding comprising a first component, a second component, and a third component by means of an injection molding apparatus which comprises a first mold plate and a second mold plate, wherein the first mold plate has at least three first mold nests, the second mold plate has at least three second mold nests, and the second mold plate in a closed state cooperates with the first mold plate in the production of the plastics molding and in an opened state is rotatable relative to the first mold plate; wherein the injection molding process comprises injection molding of the first component to fabricate a 1K intermediate, of the second component onto a previously fabricated 1K intermediate, to fabricate a 1K+2K intermediate, and of the third component onto a previously fabricated 1K+2K intermediate to fabricate the plastics molding;

the injection molding process, between one or more successive closing and opening events of the first mold plate and the second mold plate, comprises a rotating of the second mold plate relative to the first mold plate in an alternately reversing direction of rotation, wherein, in a case A), 1K+2K intermediates and plastics moldings are produced alternately in two mold nests of the first mold plate, the two mold nests having identically shaped contour faces, or in a case B), 1K intermediates and 1K+2K intermediates are produced alternately in two mold nests of the first mold plate, the two mold nests having identically shaped contour faces.

* * * * *